United States Patent [19]
Detraz et al.

[11] 3,971,264
[45] July 27, 1976

[54] SCREW-AND-NUT MECHANISM WITH BALL OR ROLLER RECIRCULATION

[75] Inventors: Jacques Detraz, Chambery; Michel Gambut, La Motte Servolex, both of France

[73] Assignee: La Technique Integrale S.A., Chambery, France

[22] Filed: May 14, 1974

[21] Appl. No.: 469,800

[30] Foreign Application Priority Data
May 16, 1973 France .............................. 73.17737

[52] U.S. Cl. .............................. 74/459; 74/424.8 R
[51] Int. Cl.² ............................................ F16H 1/18
[58] Field of Search ............ 74/89.15, 459, 424.8 R

[56] References Cited
UNITED STATES PATENTS
2,343,507  3/1944  Hoffar .................................. 74/459
3,327,551  6/1967  Prueter ................................ 74/459

FOREIGN PATENTS OR APPLICATIONS
1,244,838  9/1960  France ................................ 74/459

*Primary Examiner*—Benjamin W. Wyche
*Assistant Examiner*—Wesley S. Ratliff, Jr.
*Attorney, Agent, or Firm*—Daniel M. Rosen

[57] ABSTRACT

A screw-and-nut mechanism with a ball recirculation channel comprising bent, tubular inlet and outlet elements connected to each other by a connecting means, the tubular elements being engaged in a bore of the nut member in such a way as to emerge at the bottom of the thread, and the connecting means being embedded in an overmolding of the nut member.

5 Claims, 23 Drawing Figures

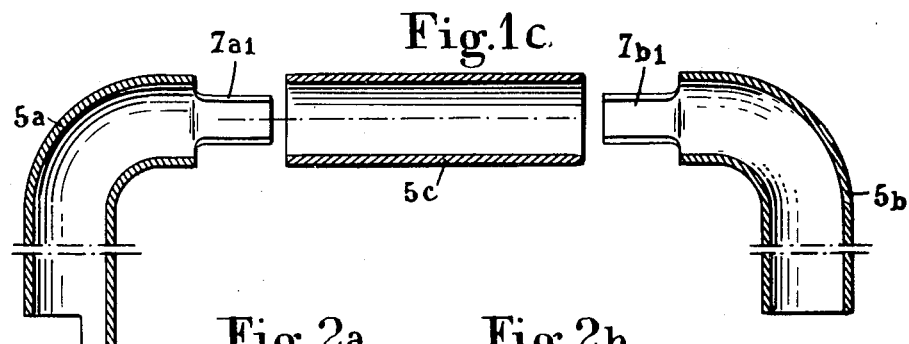
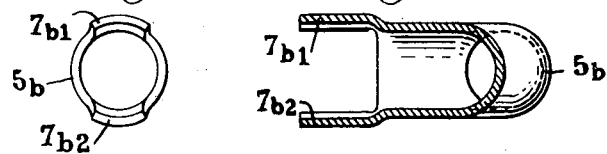
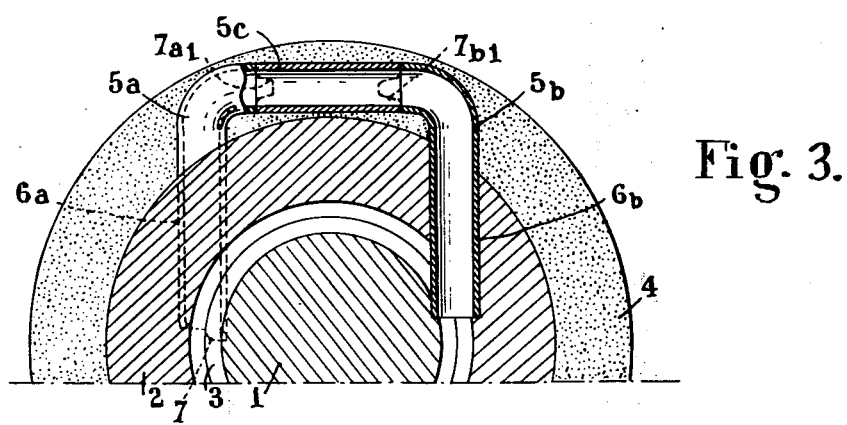
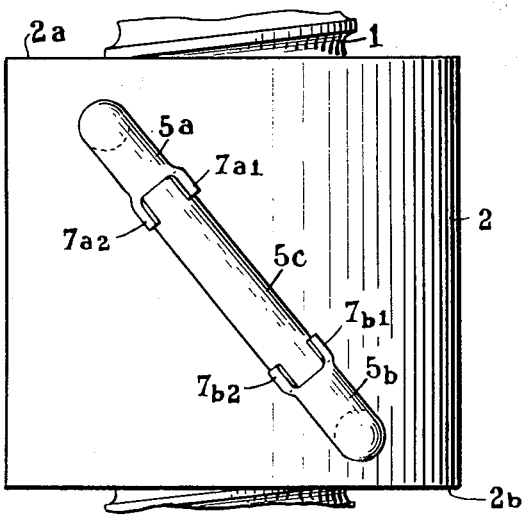

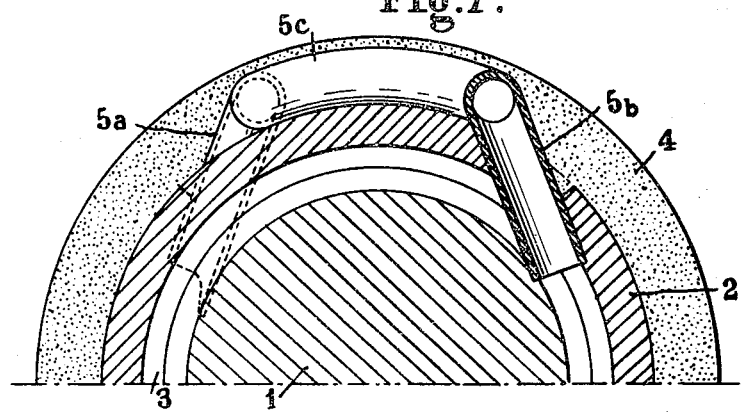
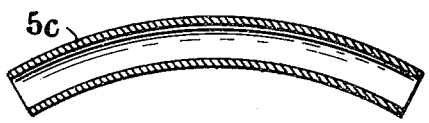
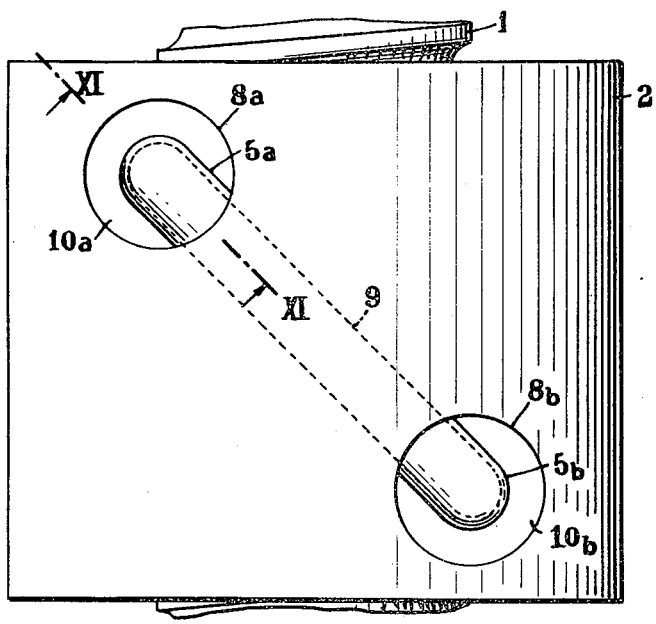
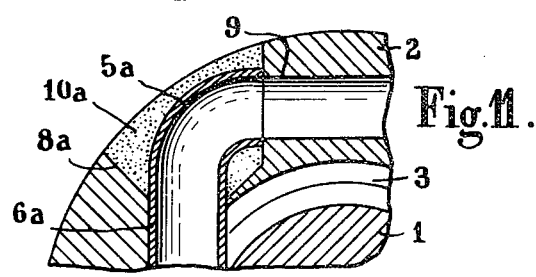

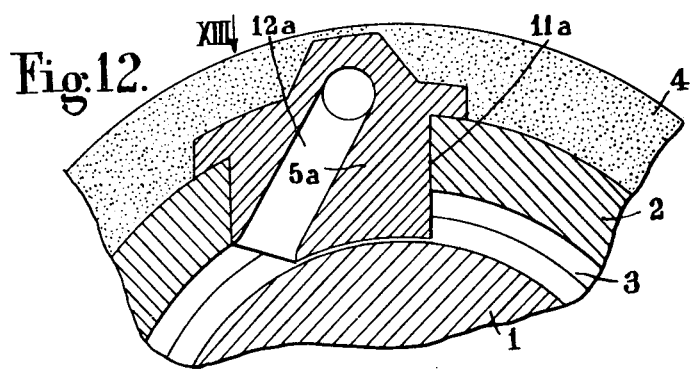
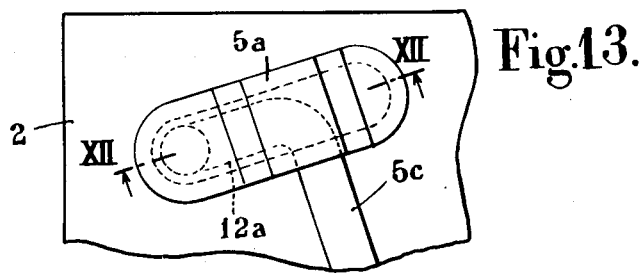
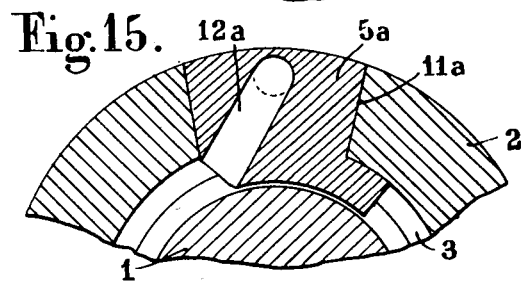
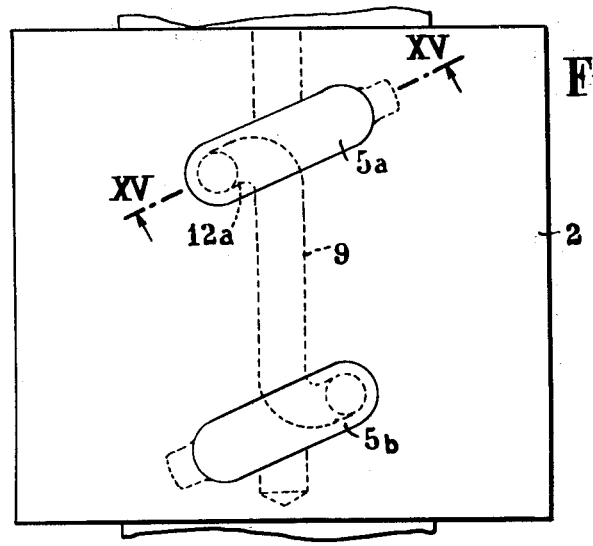

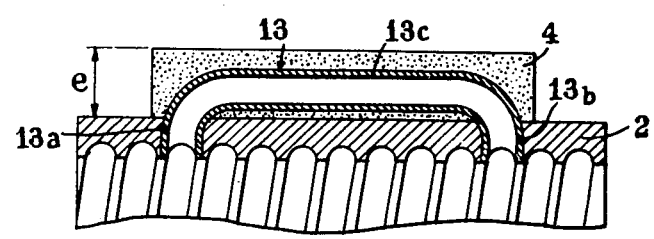
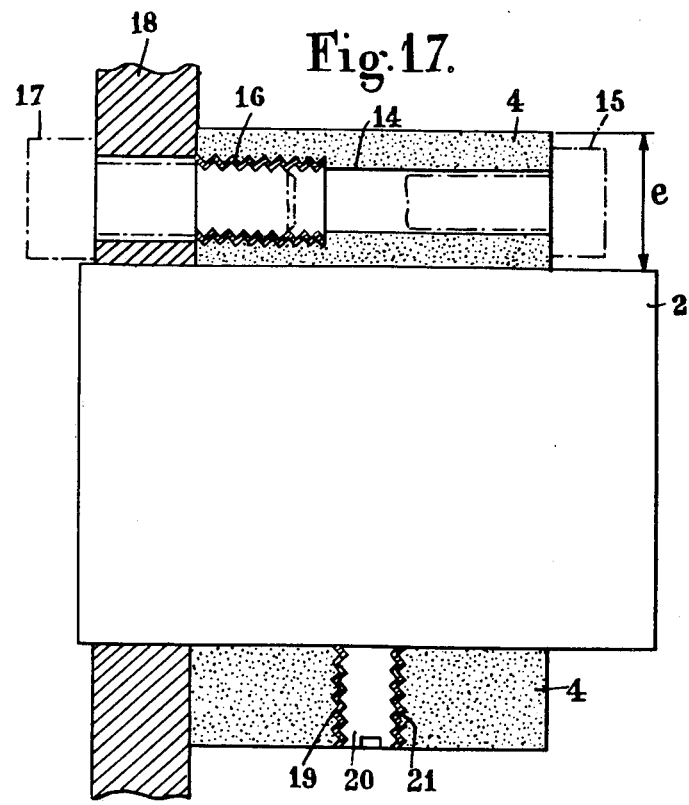

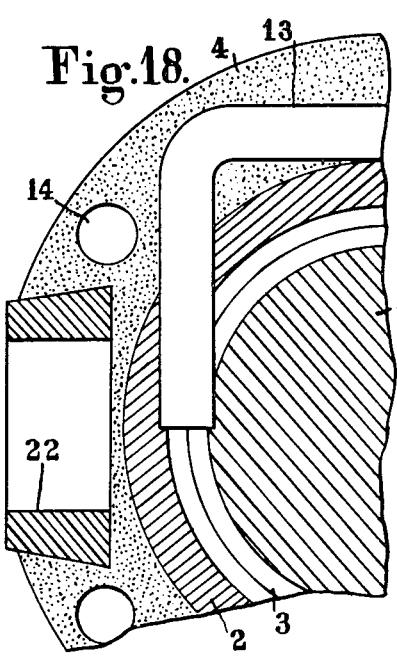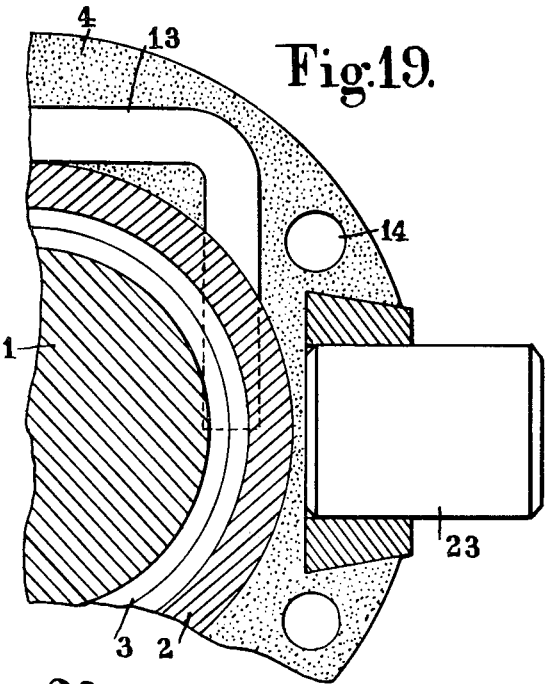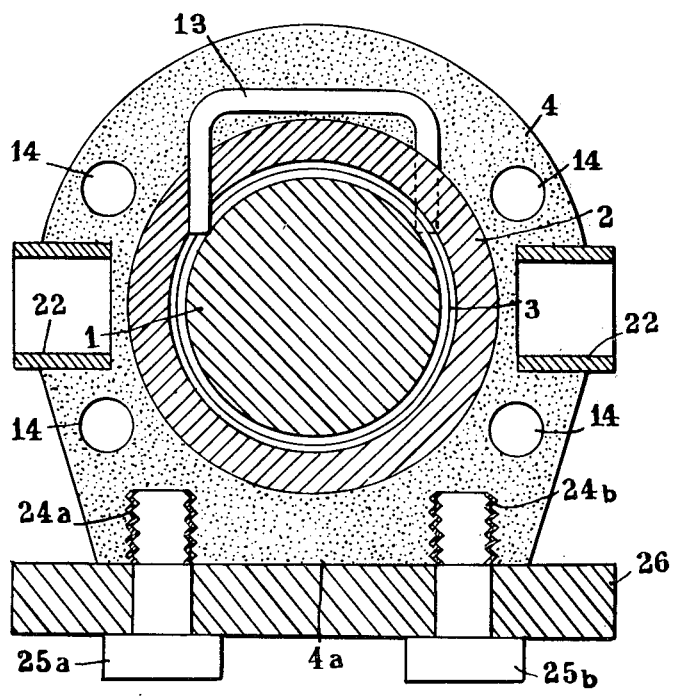

SCREW-AND-NUT MECHANISM WITH BALL OR ROLLER RECIRCULATION

BACKGROUND OF THE INVENTION

The present invention relates to a screw-and-nut mechanism with ball or roller recirculation.

Mechanisms of this kind are used for transforming a rotational movement into a translatory movement, and for effecting such transformation in the reverse order; these devices each comprise a screw and a nut having one or more screw-threads disposed in such a way as to delimit one or more running channels for balls or rollers between the end faces of the nut, thereby ensuring transmission of the forces with very little friction and enabling such transformation of movement to be effected with a very high efficiency. When the balls or rollers have reached one end of the circulating channel they have to be led back to the other end of the same channel in such a way as to run in a closed circuit. Various methods are known for effecting this "recirculation" of the balls or rollers, particularly via a recirculating channel which is disposed externally with respect to the screw-thread of the nut, so as to connect the two ends of the circulating channel.

Various embodiments of such recirculating channels are known, which include merely a duct machined into the material of the nut externally with respect to its threading, or a tubular element in one piece or in two half-shells, or including one or more connecting means, which may likewise be composed of half-shells.

These various elements are formed, for instance in sheet metal, in drawn sheet metal, in cast steel or in molded synthetic material. Each element thus acts in such a way that all or part of the recirculating device may appear in different embodiments as regards either the particular geometrical design, the material used, the mode of connection to the nut member or to one of the other recirculating elements.

SUMMARY OF THE INVENTION

According to the present invention a screw and nut mechanism with ball or roller recirculation comprises a recirculation channel in at least two elements, and inlet and outlet means which are preferably bent and connected to each other by a connecting means. One of these two tubular elements is engaged in a bore of the nut member in such a way as to emerge at the bottom of the thread, characterized in that at least the connecting means is encased in an overmolding of the nut member. The overmolded part can be a tubular sleeve which can have sufficient radial thickness to permit providing holes therein, which may be either plain or with a screw-thread in them. Said holes may be for instance, longitudinal holes for fixing a collar or flange to the nut, or transverse holes for fixing a straight-edge or for lubrication. Male or female pivots or other accessories of the nut member may be encased into the said overmolded sleeve.

The present invention thus renders it possible to manufacture, at a comparatively low cost price, a whole collection of screw-and-nut mechanisms with ball or roller circulation, presenting a variety of mechanical characteristics, e.g. graded in a standardized manner, the recirculating channels of all these nut members being formed by a small number of identical elements, or differing only among each other by their length, and all having very simple shapes obtainable by machining and casting operations not presenting any great difficulty, said nut members being, moreover, equipped with a large number of varied accessories according to users' choice.

The present invention also permits economic manufacture of the threaded ring, since the tube with its screw-thread need not be machined externally with respect to the recirculation, which latter also does not need to be fixed to the body of the threaded ring via metal or otherwise specially machined parts.

Several embodiments of the screw-and-nut mechanism with ball or roller circulation according to the present invention are described below as examples and illustrated schematically in the attached drawings.

BRIEF DESCRIPTION OF THE DRAWINGS

FIG. 1b is a top plan view of one of the two bent tubular elements, taken along line Ib — Ib of FIG. 1a.

FIG. 1c is an elevation view, in section and exploded of the recirculation channel of FIG. 1a.

FIG. 2a is an end elevation view of one of said two, bent tubular elements, taken along line IIa — IIa of FIG. 1b.

FIG. 2b is a sectional view of said element of FIG. 2a, taken along line IIb — IIb of FIG. 1a.

FIG. 3 is a cross-sectional view of an embodiment of the nut member according to the present invention, whose recirculating channel is formed substantially by tubular elements illustrated in previous Figures.

FIG. 4 is a top-plan view of the nut member of FIG. 3, prior to overmolding.

FIGS. 7 and 8 are views, similar and corresponding respectively to FIGS. 3 and 4, of another embodiment adapted for high-pitch threads.

FIG. 9 is a sectional view taken through a horizontal plane, the middle tubular element of the recirculating channel of FIGS. 7 and 8 is equipped.

FIG. 10 gives a top-plan view of another embodiment of a nut member according to the present invention.

FIG. 11 is a partial sectional view taken along line XI—XI of FIG. 10.

FIG. 12 gives a view similar to FIG. 11, of a variant of the embodiment illustrated in FIGS. 10 and 11.

FIG. 13 is a partial top plan view in the direction of the arrow XIII of FIG. 12, prior to overmolding of the nut member.

FIG. 14 is a top-plan view of another embodiment of the nut member according to the present invention.

FIG. 15 is a partial sectional view taken along line XV—XV of FIG. 14.

FIG. 16 is a partial sectional view of another embodiment of the nut member according to the present invention, in which an overmolding in synthetic material forms a tubular sleeve surrounding the middle part of the threaded metal ring.

FIG. 17 is a view similar to that of FIG. 16, wherein the overmolded tubular sleeve is shown in section to illustrate various applications of this tubular sleeve.

FIGS. 18 and 19 are sectional views of variants of the nut member of FIG. 16, provided respectively with female pivots and male pivots.

FIG. 20 is a sectional view a cross-section of a variant of the nut member of FIG. 16, provided with female pivots and a support at right angles.

DETAILED DESCRIPTION OF THE PREFERRED EMBODIMENTS

Figure 1A:
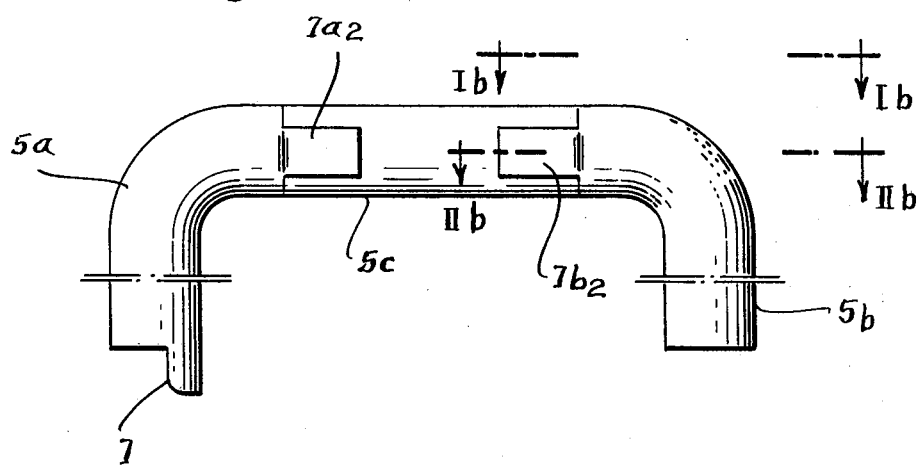
FIG. 1a is an elevation view of three tubular elements forming a recirculation channel.

In FIGS. 3 and 4, the numeral 1 denotes a screw designed to cooperate with a nut via bearing balls; this screw 1 may have any number of threads, the pitch of which is selected as a function of the intended application, the nut member according to the present invention, which is intended to cooperate with screw 1 via balls, not shown, comprises the following two parts: a metal ring 2, which is threaded internally, in accordance with screw 1, in such a way that the balls can circulate in one or more helicoidal channels 3 (FIG. 3), bounded by the screw-threads of parts 1 and 2; the nut member according to the present invention is completed by a tubular sleeve 4 (not shown in FIG. 4), which is overmolded on the metal ring 2 and is shaped of suitable moldable material, such as synthetic material, or cast steel.

The recirculating channel of the balls of the nut member, illustrated in FIGS. 3 and 4, which enables the balls that have reached one of the ends, i.e., an exit location, of their recirculating channel 3, near the corresponding outermost face 2a of the threaded ring 2, to be led back to the other end, i.e., an inlet location, of the said recirculating channel 3, near the other end face 2b of the threaded ring 2, is of the external type, which means that it is situated outside the cylindrical surface of the threads of screw 1 and of the threaded ring 2; according to the present invention this recirculating channel is formed by three tubular elements assembled with each other, namely an inlet element 5a and an outlet element 5b, both bent substantially at right angles, and an intermediate element 5c with a rectilinear axis (see also FIGS. 1c and 2a, 2b). The inlet and outlet elements, 5a and 5b, each have one end engaged in a bore 6a or 6b of the threaded ring 2; emerging at the bottom of the thread as can be seen in FIG. 3, one end of the inlet element 5a is furthermore provided with a ball extractor, formed by an extension 7 which at said exit location intercepts the balls circulating in channel 3 and forces them into the inlet element 5a of the recirculating channel. In the embodiment considered, the three tubular elements 5a, 5b and 5c are assembled with the aid of pairs of elastic straps, $7a_1 - 7a_2$ and $7b_1 - 7b_2$, provided respectively at the connecting ends of the inlet and outlet elements, 5a and 5b; these straps, which are clearly seen in FIGS. 2a and 2b, grip the corresponding ends of the intermediate element 5c. The latter, and the corresponding bend ends of the inlet and outlet elements 5a and 5b, are entirely countersunk in the overmolded tubular sleeve 4 as seen in FIG. 3.

The tubular elements 5a, 5b and 5c of the recirculating channel may each be made from one single piece, for instance in molded synthetic material, or in drawn sheet metal; each may consist of two half-shells, made by molding or drawing and assembled by any suitable means; such assembly is, moreover, only essential for the middle element 5c and cannot be other than a provisional assembly, since the two half-shells are definitely fixed in position by the overmolding.

The nut with an overmolded tubular sleeve may, in general, have a rather smaller external diameter than that of the metal one-piece nuts which have so far been used for the same applications; indeed, the threaded metal ring 2 may have a particularly reduced diameter as compared with that of an equivalent one-piece metal nut, which reduction in diameter of the threaded ring 2 is only limited by the requirements imposed by the forces to be transmitted, the necessary stiffness of the nut assembly and the machining possibilities.

It is therefore provided that threaded rings whose nominal axial lengths, external diameters, internal diameters, numbers of screw-threads and pitches have great variations from each other, may nevertheless be equipped for the recirculation of balls all having the same diameter, with the same tubular inlet elements 5a and 5b and with intermediate tubular elements 5c, with rectilinear axis, which only differ from each other by their length; this circumstance is very favorable in regard to the manufacture and storage of the necessary parts for the transfer channels for recirculation of a very varied range of nut members of the type considered.

Figure 5:
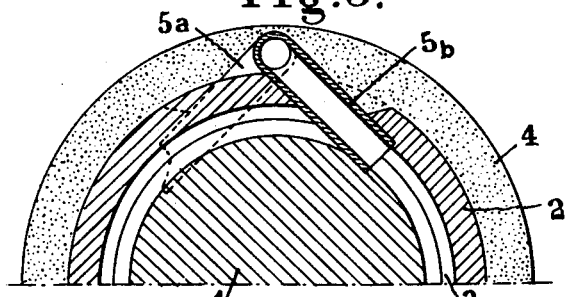
FIGS. 5 and 6 are views, similar and corresponding respectively to FIGS. 3 and 4, of a specially adapted embodiment for low-pitch threads.
Figure 6:
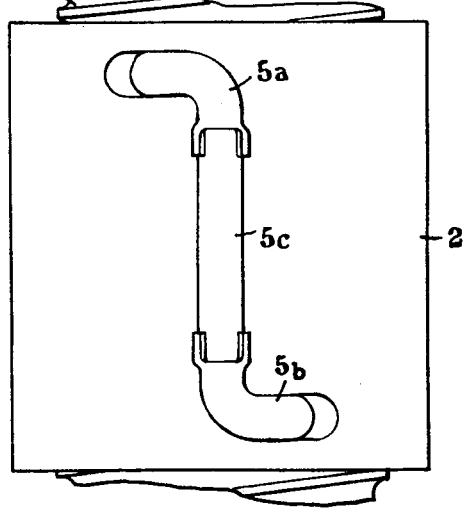

FIGS. 5 and 6 depict a variant embodiment of FIGS. 3 and 4 in which the screw 1 and the threaded ring 2 of the screw member according to the present invention have helicoidal screw-threads of low pitch; in this embodiment the bent tubular inlet and outlet elements 5a and 5b have ends which extend to the bottom of the thread, and are engaged respectively in bores of the threaded ring 2 which bores are almost perpendicular to the longitudinal axis of the screw 1 and the threaded ring 2, so that the intermediate tubular element 5c may be positioned parallel to this axis, as can be seen in FIG. 6; there remains a tubular element with a rectangular axis.

Figure 8:
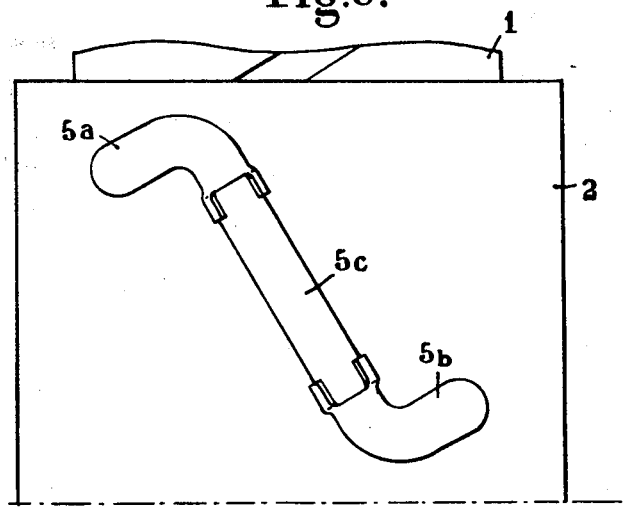

FIGS. 7 and 8 disclose another variant embodiment of FIGS. 3 and 4, in which the screw 1 and the threaded ring 2 of the nut member according to the present invention show high-pitch helicoidal screw-threads; in this case the middle tubular element 5c is inclined with respect to the longitudinal axis of the screw 1 and the threaded ring 2, as can be seen in FIG. 8, and, in order to reduce the radial thickness of the overmolded tubular sleeve 4 as much as possible, and on account of the external diameter of the nut assembly, the middle tubular element 5c preferably has a slightly curved axis, as can be seen in FIGS. 7 and 9. Intermediate elements of the same diameter and the same curvature, but of different length, may be used for equipping nut members of different characteristics, as has previously been pointed out.

In the embodiment of the screw nut according to the present invention, which is illustrated schematically in FIGS. 10 and 11, the threaded ring 2 has an external diameter as provided for the whole of the nut member, while the two bores, such as 6a (FIG. 11), which are provided for engaging the tubular inlet and outlet members 5a and 5b respectively, emerging at the bottom of the thread in the recirculating channel of the balls, have a broadened section, 8a or 8b, emerging onto the external circumference of the threaded ring 2; this threaded ring 2, usually of metal, has a recirculation bore 9 machined into it, which connects the corresponding ends of the two tubular inlet and outlet elements 5a and 5b. The holes 8a and 8b are filled with a molded material, 10a, 10b, for instance of synthetic material, the molding being effected in such a manner as to ensure the continuity of the cylindrical surface of the external circumference of nut 2, as seen in FIG. 11.

Figure 1B:
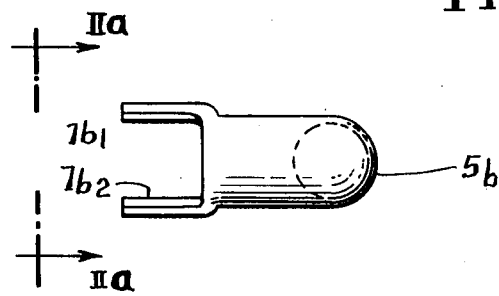

In the embodiment of the nut member according to the present invention which is illustrated schematically in FIGS. 12 and 13, the channel for recirculation of the balls is still formed by three butt-joined elements: an inlet element 5a, an outlet element not shown, but similar to 5a, a middle tubular element, 5c, connecting the inlet and outlet elements to each other. In this embodiment each of the inlet and outlet elements, such as 5a, is formed by a block of molded material, particularly synthetic material, which is encased in a bore 11a of the threaded ring 2 of the nut member; as can be seen from FIG. 13, this bore, and the block of molded material 5a, which is encased in it, has an elongated shape, extending substantially in the direction which is tangential to the thread of the screw and nut. Installed in each of the inlet and outlet elements, such as 5a, is a channel element 12a, preferably bent, one end of which emerges at the bottom of the thread, in the ball circulating channel 3, while its other end emerges into the corresponding end of the intermediate tubular element 5c; assembly between the different elements 5a, 5b (not visible in FIGS. 12 and 13) and 5c of the recirculating channel is effected by one of the means indicated in the foregoing. The three elements 5a, 5b and 5c of the recirculating channel are still locked by a tubular sleeve 4, e.g. of synthetic material, overmolded on to the threaded ring 2, as can be seen in FIG. 12. Of course, according to the helicoidal slope of the screw-threads, the middle tubular element 5c may be positioned obliquely with respect to the longitudinal axis of the nut member, or parallel to that axis, and the said middle tubular element may itself have a rectilinear or slightly curved longitudinal axis, as illustrated in FIGS. 1 and 9.

FIGS. 14 and 15 represent another variant embodiment of FIGS. 12 and 13 in which each of the inlet and outlet elements, 5a and 5b, is formed by a block made of molded material, whose external surface is shaped in such a way as to ensure continuity of the external cylindrical surface of the threaded ring 2; the middle element of the recirculating channel is formed by a bore 9 machined into the material, usually metal, of the threaded ring 2, parallel to its axis, as can be seen in FIG. 14. This embodiment, which does not comprise a tubular sleeve overmolded on to the threaded ring 2, renders it possible to make nut members having a particularly small external diameter to meet specific requirements.

FIG. 16 depicts a nut member according to the present invention, which is formed substantially by an internally threaded ring 2, usually of metal, whose middle part is surrounded by an overmolded tubular sleeve 4, particularly of synthetic material; this set-up offers the advantage of freeing the ends of the threaded metal ring 2 by which the latter can be mounted in a part of the machine for which the said nut member is intended, while ensuring a positioning of the said nut member which is largely independent of the forces transmitted to the nut member, owing to the fact that its end parts, which are of metal, show a high resistance to deformation and to wear. According to the present invention the overmolded tubular sleeve 4 shows a radial thickness e which is sufficient to enable at least part of the ball recirculating channel (not shown) to be installed or housed therein; in the embodiment illustrated in FIG. 16 this recirculating channel is formed by a tube 13, in one piece or in two half-shells, made of molded synthetic material or of drawn sheet metal, whose two bent ends, 13a and 13b, are partly engaged in corresponding bores of the threaded ring 2, so as to emerge at the bottom of the thread, while the middle part 13c of the said tube 13 is encased in the overmolded tubular sleeve 4.

The tube 13 (FIG. 16) which constitutes the recirculating channel may preferably be formed, according to the present invention, by three independent butt-joined elements: one inlet and one outlet element, corresponding respectively to the bent ends 13a and 13b of the tube 13 alone, and an intermediate element corresponding to its middle part 13c.

FIG. 17 is a view of a screw-and-nut mechanism similar to that of FIG. 16, cut sectionally by an axial plane perpendicular to that in FIG. 16, the threaded ring 2 shown uncut. This FIG. 17 shows that it is possible, having regard to the rather large radial thickness e of the overmolded tubular sleeve 4, to provide for longitudinal holes such as 14 to be made in the said tubular sleeve 4. In FIG. 17, the right-hand part of the longitudinal part 14 is smooth, which enables it to be used for engagement of the rod of a bolt 15 designed for fixing to the nut member a flange with threaded holes (not shown); in the left-hand part of the longitudinal hole 14 a screw-thread 16 of a known type has been provided which enables a flange with clearance holes, 18, to be fixed to it under excellent mechanical conditions, with the aid of bolts such as 17. In the bottom part of FIG. 17 the possibility is indicated of providing in the overmolded tubular sleeve 4 a radial hole 19 which is extended to the bottom of the thread by a drilled hole (not shown), likewise radial, in the threaded ring 2; this feature in its entirety constitutes a lubrication hole, which can be sealed off by a stopper 20, screwed for instance into a screw-thread 21.

FIGS. 18 to 20 illustrate the possibility of incorporating different accessories in the overmolded tubular sleeve 4 of a screw-and-nut mechanism according to the present invention. In FIGS. 18 and 19 respectively, female pivots 22 and male pivots 23 are situated in the tubular sleeve 4; in FIG. 20 the overmolded tubular sleeve 4 presents a plane face 4a, perpendicular to which, in the material of the said tubular sleeve 4, two holes 24a and 24b with threads are provided into which two bolts, 25a and 25b are screwed for fixing a metal straight-edge 26.

We claim:

1. In a recirculating ball, screw-and-nut mechanism operable with a plurality of balls situated in at least one helical passage formed by mating grooves of screw and nut members of the mechanism, said passage including axially spaced inlet and exit locations for said balls to enter and exit the passage, the improvement in combination therewith wherein said nut member has an outer surface and inlet and exit bores extending from said surface inward to and entering said helical passage at said inlet and exit locations, said improvement further comprising a molded casing surrounding said nut, and a recirculation channel comprising tubular inlet and exit parts respectively in said inlet and exit bores, each of said parts having one end communicating with said helical passage at said inlet and exit locations and a remote end outward of said outer surface, and a tubular connecting means encased in said casing and interconnecting said two remote ends, thus forming a continuous tube, whereby said balls can, via said recirculation channel, exit and re-enter said helical passage, said inlet and exit parts and connecting means of said recirculation channel being three separable elements.

2. In a recirculating ball, screw-and-nut mechanism operable with a plurality of balls situated in at least one helical passage formed by mating grooves of screw and nut members of the mechanism, said passage including axially spaced inlet and exit locations for said balls to enter and exit the passage, the improvement in combination therewith wherein said nut member has an outer surface and inlet and exit bores extending from said surface inward to and entering said helical passage at said inlet and exit locations, said improvement further comprising a molded casing surrounding said nut, and a recirculation channel comprising tubular inlet and exit parts respectively in said inlet and exit bores, each of said parts having one end communicating with said helical passage at said inlet and exit locations and a remote end outward of said outer surface, and a tubular connecting means encased in said casing and interconnecting said two remote ends, thus forming a continuous tube, whereby said balls can, via said recirculation channel, exit and re-enter said helical passage, said inlet and exit parts of said recirculation channel comprising molded blocks situated in said inlet and exit bores, respectively, and an inlet and exit tube, respectively, in said blocks for communicating said balls between said helical passage and said connecting means.

3. A mechanism according to claim 1 wherein said nut member is a round cylinder and said casing is a round cylinder outwardly adjacent and conforming thereto.

4. A mechanism according to claim 3 wherein said casing has thickness in the radial direction greater than the diameter of said balls.

5. A mechanism according to claim 1 wherein said inlet and exit parts form substantially 90° bends.

* * * * *

UNITED STATES PATENT AND TRADEMARK OFFICE
CERTIFICATE OF CORRECTION

PATENT NO. : 3,971,264
DATED : July 27, 1976
INVENTOR(S) : Jacques Detraz et al

It is certified that error appears in the above-identified patent and that said Letters Patent are hereby corrected as shown below:

Column one, line 46 after "one" insert --end--.

Column two, line 43 omit "," after "plane" and insert --through--

Column two, line 44 omit "is equipped".

Signed and Sealed this

Ninth Day of May 1978

[SEAL]

Attest:

RUTH C. MASON
Attesting Officer

LUTRELLE F. PARKER
Acting Commissioner of Patents and Trademarks